US007974615B2

(12) United States Patent
Talty et al.

(10) Patent No.: US 7,974,615 B2
(45) Date of Patent: *Jul. 5, 2011

(54) METHOD AND SYSTEM FOR COMMUNICATING BETWEEN A COMMUNICATIONS SOURCE AND A MOBILE PLATFORM

(75) Inventors: Timothy J. Talty, Beverly Hills, MI (US); Cem U. Saraydar, Royal Oak, MI (US); Michael B. Ames, Lake Orion, MI (US); Andrew J. MacDonald, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 856 days.

This patent is subject to a terminal disclaimer.

(21) Appl. No.: 11/829,296

(22) Filed: Jul. 27, 2007

(65) Prior Publication Data

US 2008/0032685 A1 Feb. 7, 2008

Related U.S. Application Data

(60) Provisional application No. 60/821,437, filed on Aug. 4, 2006.

(51) Int. Cl.
*H04W 4/00* (2009.01)
(52) U.S. Cl. ...... 455/422.1; 455/445; 455/428; 455/456.1; 455/426.2; 370/338; 370/401; 370/352; 370/252; 370/392; 379/221.01; 709/228
(58) Field of Classification Search .......... 455/456.5, 455/427, 466, 402.2, 518, 701, 422.1; 709/224, 709/220; 370/328, 316; 701/35, 213, 223, 701/200, 214
See application file for complete search history.

(56) References Cited

U.S. PATENT DOCUMENTS

| | | | |
|---|---|---|---|
| 5,919,239 A * | 7/1999 | Fraker et al. ............ 701/35 |
| 6,115,667 A | 9/2000 | Nakamura | |
| 6,157,809 A * | 12/2000 | Kambayashi .......... 725/91 |
| 6,321,091 B1 | 11/2001 | Holland | |
| 6,529,731 B2 * | 3/2003 | Modzelesky et al. ..... 455/427 |
| 6,711,418 B1 * | 3/2004 | Wang et al. ........... 455/553.1 |
| 6,785,553 B2 * | 8/2004 | Chang et al. .......... 455/456.5 |
| 6,853,911 B1 | 2/2005 | Sakarya | |
| 6,937,936 B2 | 8/2005 | Nimura | |
| 7,031,717 B2 | 4/2006 | Mazzara | |
| 7,142,900 B1 * | 11/2006 | Straub .................. 455/701 |
| 7,184,888 B2 | 2/2007 | Furukawa | |
| 7,653,680 B2 | 1/2010 | Itaba et al. | |
| 7,729,684 B1 * | 6/2010 | Straub ................ 455/404.2 |
| 2002/0188402 A1 | 12/2002 | Huang et al. | |
| 2003/0007465 A1 * | 1/2003 | Artzi ................... 370/316 |
| 2003/0069691 A1 * | 4/2003 | Schroeder ............. 701/213 |
| 2003/0069961 A1 * | 4/2003 | Kaushik et al. ........ 709/224 |
| 2003/0078061 A1 * | 4/2003 | Kim .................... 455/466 |
| 2003/0208317 A1 * | 11/2003 | Chang et al. .......... 701/213 |

(Continued)

FOREIGN PATENT DOCUMENTS

CN  1338720 A  3/2002

(Continued)

*Primary Examiner* — Marivelisse Santiago-Cordero
*Assistant Examiner* — Joseph Arevalo

(57) ABSTRACT

A mobile platform is equipped with a broadcast signal receiver to receive a broadcast signal and with a two-way wireless communications device. Messages within the broadcast signal are received. Other messages between the communications source and the mobile platform are wirelessly communicated via the two-way wireless communications device.

15 Claims, 4 Drawing Sheets

U.S. PATENT DOCUMENTS

| | | | |
|---|---|---|---|
| 2004/0148090 A1* | 7/2004 | Melen | 701/200 |
| 2004/0248561 A1 | 12/2004 | Nykanen et al. | |
| 2005/0090235 A1 | 4/2005 | Vermola et al. | |
| 2005/0149257 A1 | 7/2005 | Linkohr | |
| 2006/0046749 A1* | 3/2006 | Pomerantz et al. | 455/457 |
| 2006/0061469 A1* | 3/2006 | Jaeger et al. | 340/539.13 |
| 2006/0074547 A1* | 4/2006 | Kaufman et al. | 701/200 |
| 2006/0080030 A1 | 4/2006 | Okude et al. | |
| 2006/0116112 A1 | 6/2006 | Isokoski et al. | |
| 2006/0135127 A1 | 6/2006 | Aarnio et al. | |
| 2006/0224317 A1* | 10/2006 | Sarkar | 701/213 |
| 2006/0293853 A1* | 12/2006 | Chiou et al. | 701/223 |
| 2007/0150140 A1* | 6/2007 | Seymour | 701/35 |
| 2007/0150190 A1* | 6/2007 | Riddiford | 701/213 |
| 2007/0265775 A1* | 11/2007 | Tsai et al. | 701/213 |
| 2008/0032721 A1 | 2/2008 | MacDonald et al. | |
| 2008/0046172 A1 | 2/2008 | Ames | |
| 2008/0095096 A1* | 4/2008 | Cho et al. | 370/328 |

FOREIGN PATENT DOCUMENTS

| | | |
|---|---|---|
| DE | 102004032916 A1 | 2/2006 |
| DE | 102004036497 A1 | 3/2006 |

* cited by examiner

US 7,974,615 B2

METHOD AND SYSTEM FOR COMMUNICATING BETWEEN A COMMUNICATIONS SOURCE AND A MOBILE PLATFORM

CROSS-REFERENCE TO RELATED APPLICATIONS

This application claims priority from U.S. Provisional Application No. 60/821,437, filed on Aug. 4, 2006, which is incorporated herein by reference.

TECHNICAL HELD

This disclosure pertains generally to mobile platforms and more specifically to wireless communications therewith.

BACKGROUND OF THE INVENTION

The statements in this section merely provide background information related to the present disclosure and may not constitute prior art.

There is a growing application of wireless telecommunication services for mobile platforms, e.g., vehicles, to provide features related to navigation and roadside assistance. Current communications systems comprise point-to-point communications, e.g., cellular systems, which typically operate at a low data bandwidth and are relatively costly. Other systems comprise satellite radio systems, which use geostationary satellites to communicate to vehicles, homes and other listening environments multiple channels of music, news and audio entertainment, and typically operates at low data bandwidth, with a national distribution.

Local over-air television broadcasters are converting to a digital television format such as the Advanced Television System Committee ('ATSC') standard, which has a data bandwidth of 19 Mbps. High definition television (HDTV) typically utilizes about 9 to 12 Mbps. This means that there is broadcast communications bandwidth available for the delivery of additional content.

SUMMARY OF THE INVENTION

A method for communicating between a communications source and a mobile platform includes equipping the mobile platform with a broadcast signal receiver device to receive a broadcast signal and equipping the mobile platform with a two-way wireless communications device. A first message broadcast from the communications source within the broadcast signal is received at the mobile platform via the broadcast signal receiver device. And, second message between the communications source and the mobile platform is wirelessly communicated via the two-way wireless communications device.

BRIEF DESCRIPTION OF THE DRAWINGS

Preferred embodiments are described in detail and illustrated in the accompanying drawings which form a part hereof, and wherein.

DETAILED DESCRIPTION OF THE PREFERRED EMBODIMENT

Figure 1:
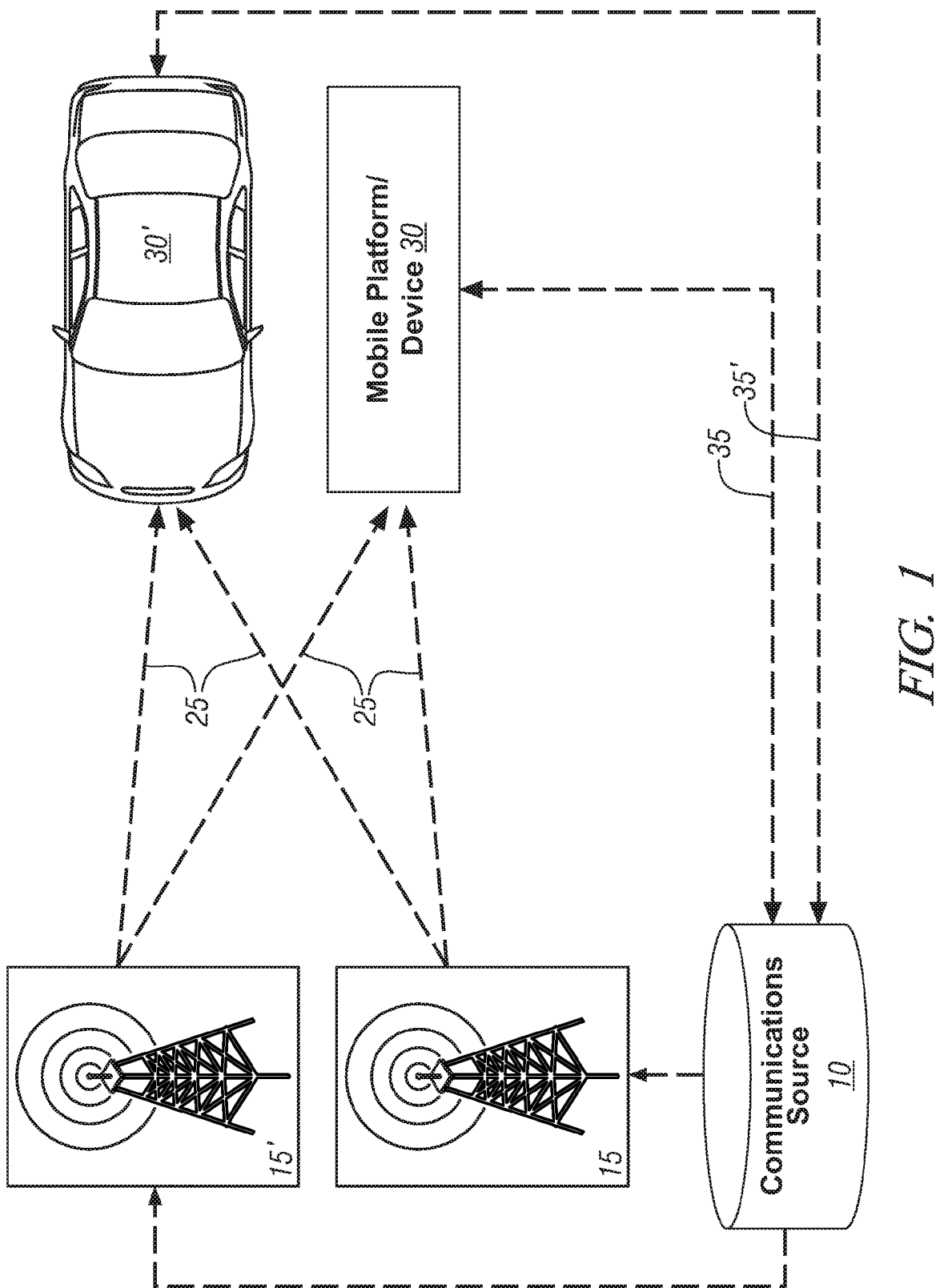
FIGS. 1-4 are schematic diagrams, in accordance with the present disclosure.

Referring now to the drawings, wherein the showings are for the purpose of illustrating embodiments only and not for the purpose of limiting the same, FIG. 1 depicts a communications system which has been constructed in accordance with an exemplary embodiment. The communications system described herein is for communicating a signal between a communications source 10 and a mobile platform, including communicating from one or more broadcasters to mobile platforms, generally designated as 30 or 30', as described hereinafter. Each mobile platform is equipped with a wireless interface device ('WID') 310 comprising a transceiver. The WID 310 comprises a broadcast message receiver device operative to receive and interpret a broadcast signal originating from the communications source, and a two-way wireless communications device operative to effect two-way wireless communications between the mobile platform(s) 30, 30' and the communications source 10. The broadcast signal, generally designated as 25, includes overall content transmitted from the communications source 10 via one or more broadcast transmitter(s) 15, 15'. The broadcast signal 25 includes publicly accessible content and a first message readable by the WID 310, at the mobile platform(s) 30, 30'. The first message is received and interpreted by the WID 310 and may be communicated to a human/machine interface ('HMI') device 350, and/or cached in an electronic memory storage device of the mobile platform. A second message, comprising a wireless two-way message, generally designated as 35, 35', is communicated between the communications source 10 and each of the mobile platforms 30, 30'. This is now described in detail.

The communications source 10 is signally linked to the broadcast transmitter(s) 15, 15'. Each broadcast transmitter(s) 15, 15' comprises an electronic device operative to generate and propagate an electromagnetic signal, i.e., the broadcast signal 25 sent from the communications source 10, over airwaves. Individual users are able to access the broadcast signal 25 using a digital television, radio, or other device. The design and operation of broadcast transmitters is generally known to one skilled in the art. The electromagnetic broadcast signal 25 is received by mobile platforms 30, 30' each having a communications transceiver. The broadcast signal preferably includes the first message which is formed at the communications source. The first message is opportunistically broadcasted from the communications source, and received and interpreted at the mobile platform by way of the broadcast message receiver of the transceiver. The second message is formed and wirelessly communicated between the communications source and the mobile platform by way of the two-way wireless communication device of the transceiver and an enterprise service provider 240 at the communication source. The mobile platforms comprise motor vehicles and other mobile platforms including handheld devices, described hereinafter with reference to FIGS. 3 and 4.

Figure 2:
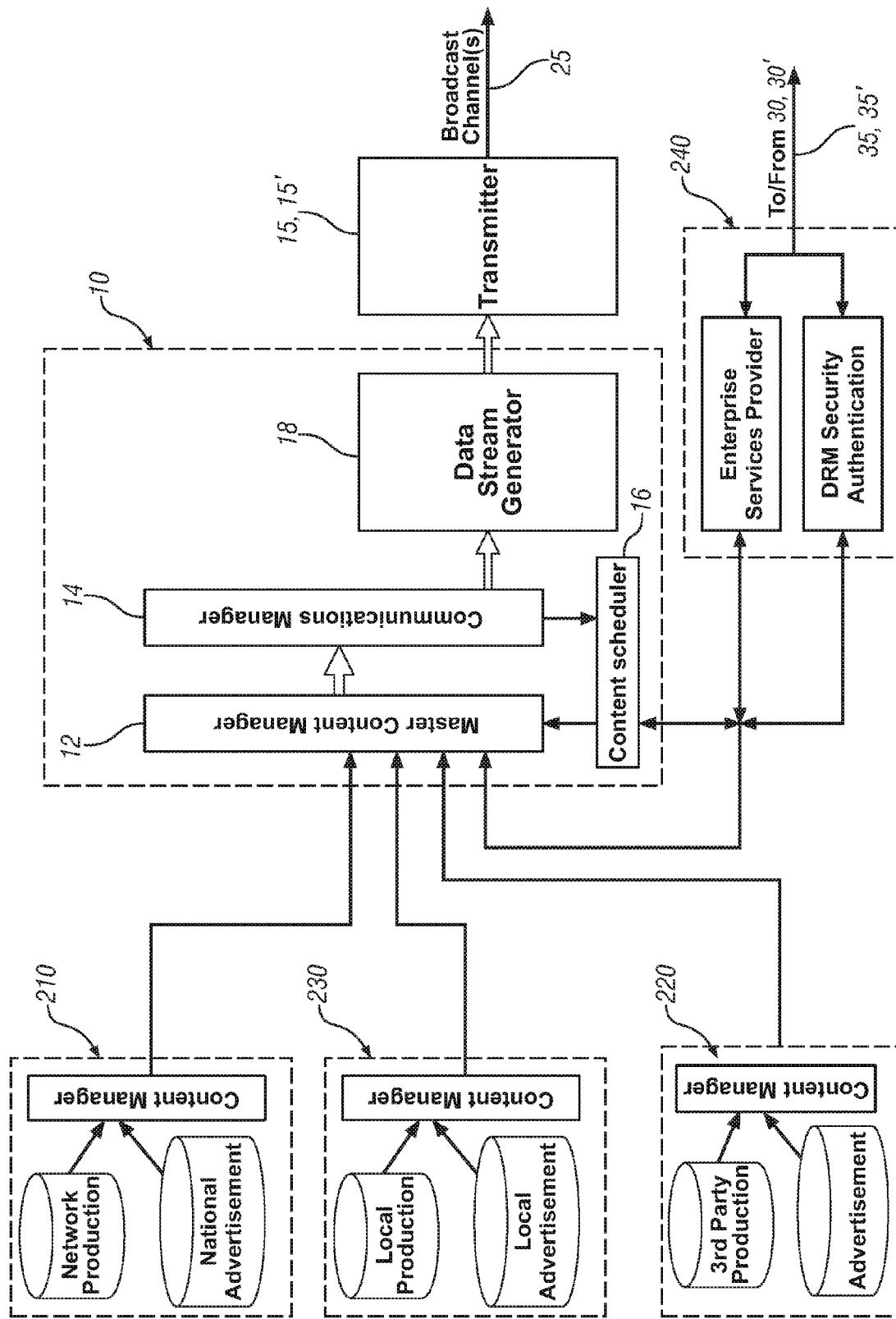

Referring now to FIG. 2, there is depicted a general flow of information through the communications source 10, in accordance with an exemplary embodiment, by which a broadcast signal is formed. The communications source depicted comprises a local television broadcasting station, although other communications sources may be used, e.g., HD radio broadcasting stations. Content providers may comprise a network provider 210, one or more third-party providers 220, and a local provider 230, each of which combines production content intended for viewing on a television with advertising through a respective content manager. The outputs of the content providers are input to a master content manager 12 of the communications source 10. Additionally, with respect to the communications source 10, there is communication to and from an enterprise services provider 240, which in turn is operative to communicate to and from mobile platforms 30, 30' via a wireless connection. The enterprise services provider 240 may also generate and provide content to mobile platforms 30, 30'. The network provider 210 generates productions having national advertising, in accordance with licensing agreements and requirements with the local broadcaster. The local provider 230 generates productions having local advertising. The third party providers 220 generate productions having national and/or local advertising. The enterprise services provider 240 generates specific message content which is security-authenticated, including, e.g., information obtained from the Internet, comprising the first message.

The communications source 10 comprises the master content manager 12, a communications manager 14, a content scheduler 16, and a datastream generator 18. The communications source 10 is operative to take outputs from the content and enterprise services providers 210, 220, 230, and 240 (hereinafter 'content providers') and form an overall message which becomes the broadcast signal 25. The message is communicated through the datastream generator 18 to generate a datastream, which is communicated to the broadcast transmitter(s) 15, 15' for broadcasting over one or more broadcast channels as the broadcast signal 25. This includes broadcasting the broadcast signal 25 to communication transceivers of mobile platforms 30 that are in signal range of the broadcast transmitter(s) 15, 15'. The master content manager 12 is operative to ensure all the content of the message is of correct format, i.e., in a format that is in compliance with applicable broadcast standards, e.g., ATSC standards, DVB standards, or another recognized broadcasting standard. The master content manager 12 joins and merges content from the various content providers, including the enterprise services provider. The content scheduler 16 monitors the communications manager 14 and receives input from the enterprise service provider 240, and performs delivery timing scheduling and prioritizes content delivery over the specific broadcast channel. The master content manager 12 assembles the content provided by the content providers and, with input from the content scheduler 16, assigns a content delivery schedule. The assembled content, i.e., the overall message, is sent to the communications manager 14 with the content delivery schedule. The communications manager 14 assigns a specific communication channel for utilization based upon the delivery schedule and communication channel parameters, including parameters such as available bandwidth and channel conditions. The communications transceiver of the mobile platform 30 includes two-way communication channels to enable the mobile platform to initiate and/or reply to the signal delivered thereto. For example, if the mobile platform has determined some of the content of the first message has expired, e.g., weather information, the mobile platform may initiate a request via one of the available two way channels to the enterprise service provider 240 and the content scheduler 16, which then acts to obtain and send updated information via one of the available broadcast channels. Further, the communication manager can inform the content scheduler of user information obtained via the two-way communication channels.

The communications manager 14 manages the broadcast channel by opportunistically assigning communication channel(s) resources, generating a compliant datastream through the datastream generator 18 that is sent to broadcast transmitter(s) 15, 15' for transmitting, and when required, verifies delivery of the first message. Thus, the first message is opportunistically broadcasted by incorporation into a high-throughput digital broadcast datastream.

Other functions of the communications manager 14 include enabling security protocols for applications requiring security and encryption, and informing the content scheduler of channel conditions. The content scheduler 16 performs delivery timing scheduling and prioritizes content delivery over the specific broadcast channel. Each of the communication channels comprises a one-way broadcast communication channel or two-way wireless communication channel between the communications transceiver of the mobile platform and the communication channel manager.

The broadcast transmitter(s) 15, 15' use known broadband broadcasting mechanisms and techniques, including those which communicate in accordance with, e.g., ATSC or other standards. The ATSC standards define digital television which has been selected by the United States Federal Communications Commission ('FCC') for terrestrial television station broadcasting, e.g., for HDTV. Broadband refers to a communication signal comprising a wide range of frequencies, permitting simultaneous transmission of multiple pieces of data, increasing data transmission rates. Thus, multiple channels are communicated using the same communications medium through a process referred to as multiplexing. The FCC-approved ATSC standard has a data throughput of 19.38 Mbps, whereas HDTV utilizes only 9 to 12 Mbps. This means that there is communications throughput available for the delivery of additional content which may be utilized. It is this portion of the broadcast signal which is preferably used to communicate the first message to the mobile platform(s) 30, 30'.

The communications source 10, using information provided by the enterprise services provider 240, is operative to provide enhanced features, applications and services to the mobile platforms 30, 30' via the broadcast transmission of the first message. Enhanced features, applications and services that are enabled by opportunistic caching of data through wireless broadcast services when the mobile platforms 30, 30' is utilized in a passenger vehicle include, e.g., vehicle performance enhancements and updates, navigation information, travel information, and entertainment information and files such as audio, image and video files. The system seeks opportunistic periods to deliver such material based on attributes of the mobile platform. Further the presentation and use of the data and information sent by the system is provided at appropriate times based on user activity with the mobile platform.

Figure 3:
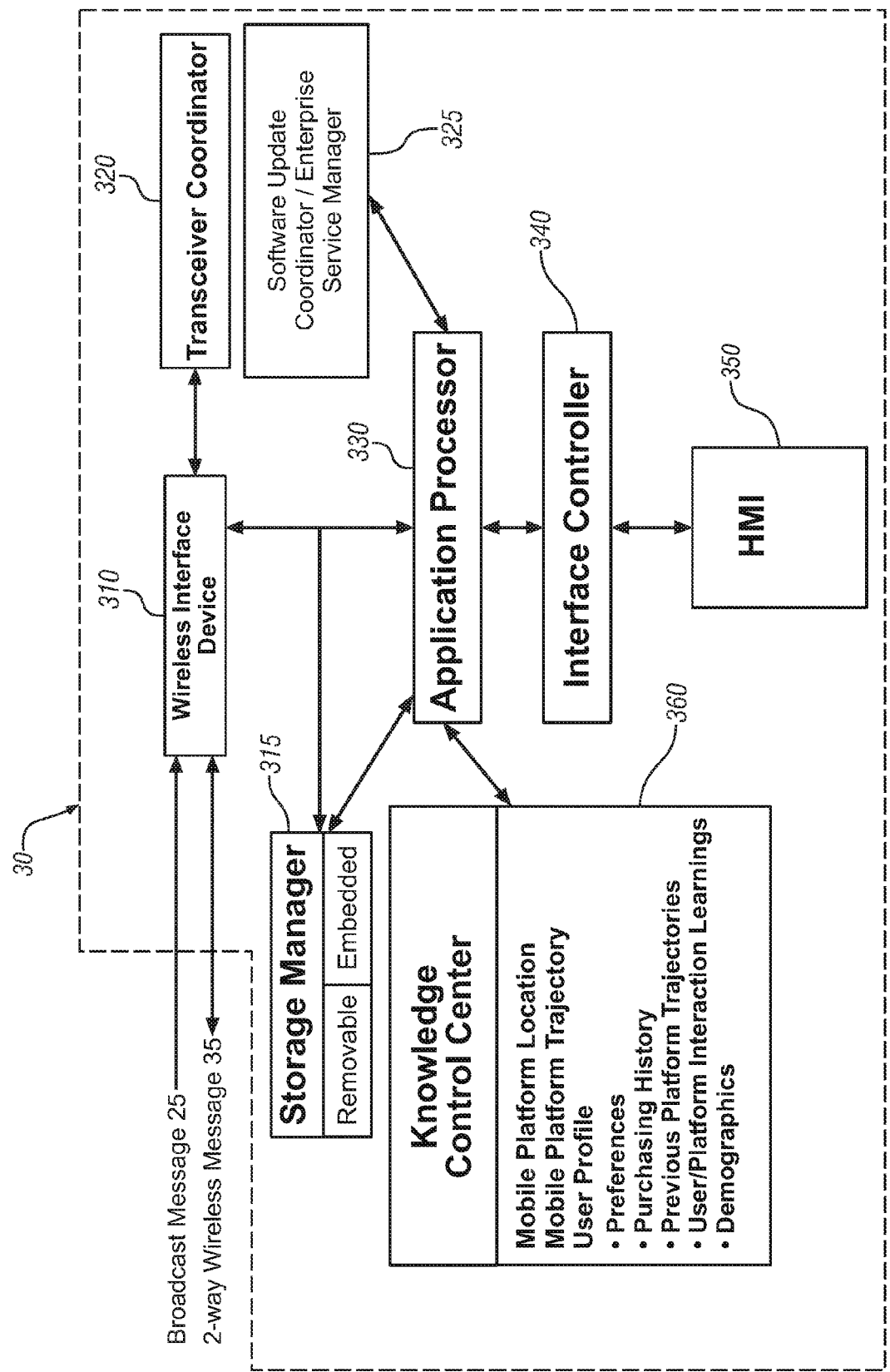
Figure 4:
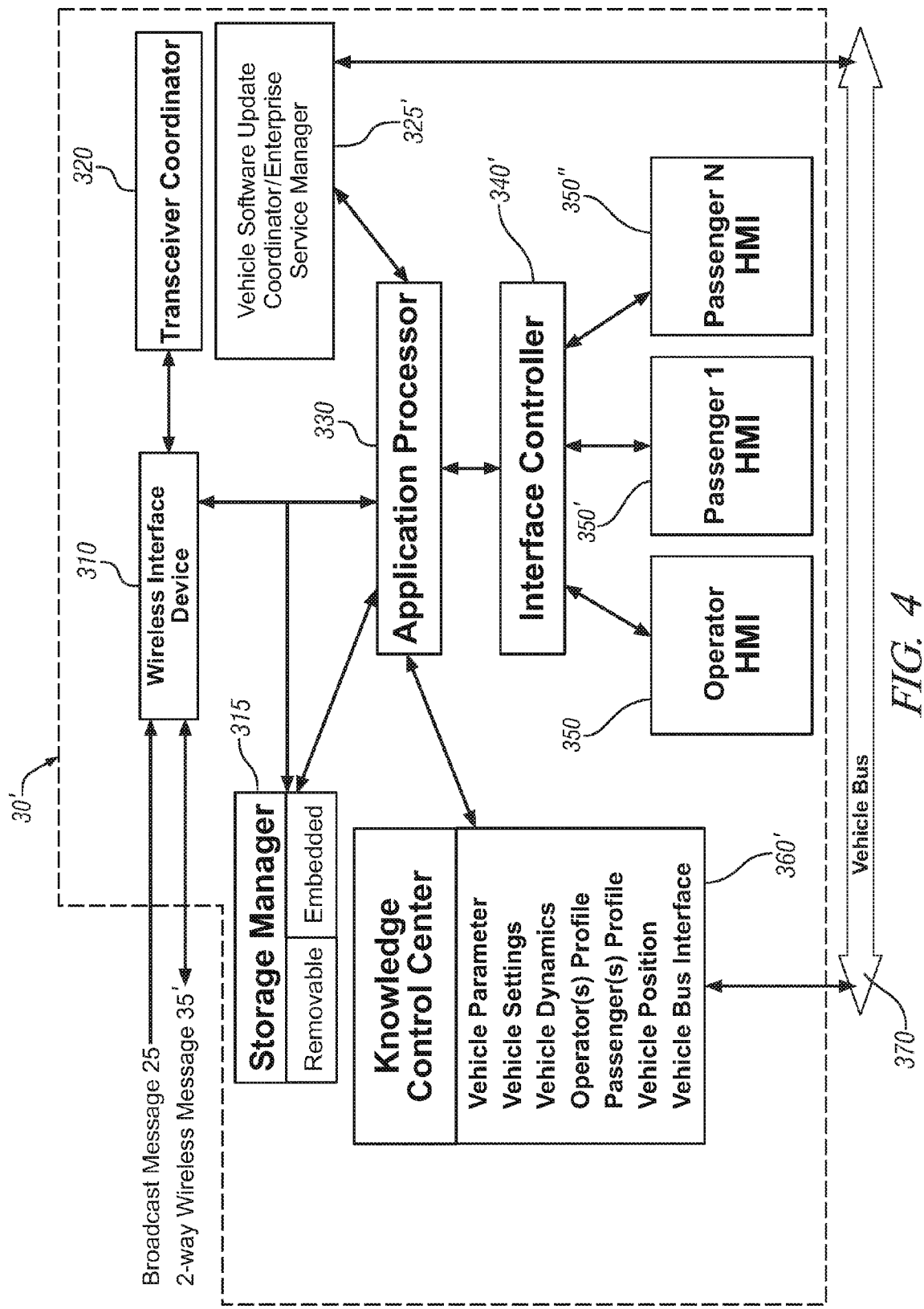

With additional reference now to FIGS. 3 and 4, the enterprise services provider 240 and the mobile platforms 30, 30' execute two-way communications, including receiving authenticated inputs and requests from the operator and/or passenger(s) of the mobile platform, via a human/machine interface (HMI) device(s) 350 at the mobile platform. The inputs and requests included in the information are communicated to the local content manager. The enterprise services provider 240 generates the first message for the broadcast signal, and facilitates acquiring content for the first message for the broadcast signal from one of the other content providers 210, 220, 230. Facilitating acquiring content includes the user of the mobile platform identifying specific information by way of the HMI, including using a menu-driven or other system for inclusion in the second message, which is formed and communicated to the enterprise services provider 240 using the two-way communications. The enterprise services provider 240 interacts with the content providers 210, 220, 230 to identify a source for the specific information, which then acquires it and provides it for inclusion in the first message.

The two-way communications link enhances the robustness of a security management system, including authentication, provisioning, and digital rights management. Thus, the wireless two-way message may be used to authenticate the broadcast signal, including the first message. It may also aid in the delivery of missing data either by allowing the mobile platform to request retransmission of data via the broadcast signal 25 or by delivering the missing data directly via the two-way wireless message 35, 35'.

An encoded directory structure residing on a remote server as a string may be periodically transmitted uni-directionally, i.e., via broadcast signals, to the mobile platform for consumption. The mobile platform can pick up and choose content from the directory structure to display. The directory structure may be populated with a mixture of dynamic and static content collected from the Internet and private sources. Furthermore, the content may be delivered to multiple locations within the vehicle, e.g., front and back seat vehicle screens either in real-time or stored for consumption at a later time. Such delivery processes include delivering packets of information that are acknowledged as received via the two-way wireless message 35. The uplink can facilitate monitoring of exposure to advertising, and report application or service usage for billing and other purposes.

The first message of the broadcast signal 25, in the form of electronic data, is opportunistically transmitted, and received and cached in each mobile platform during periods of availability of bandwidth and/or the availability of the communication channel through the communication source 10 and transmitter(s) 15, 15'.

Delivery of the first message to the mobile platform requires a communication transmission channel and a minimum bandwidth determined by well-known theorems such as Shannon Theorem, the operation of which is provided at the communications source 10. In cases where exact real time delivery is not required, bandwidth requirement can be distributed in various dimensions such as time, and spreading codes and/or frequencies. Various sections of the electronic data making up the first message may be scattered by the communications manager 14 in these various dimensions and then re-assembled at the communications transceiver of the mobile platform(s) 30, 30'. The communications source 10 opportunistically assigns the delivery mechanisms, comprising throughput, time, frequency, and other parameters of the broadcasting and communication system, based upon availability. The communications manager 14 coordinates the distribution of the first message through the broadcast transmitter(s) 15, 15'.

The mobile platform 30 takes the form of a handheld device and is preferably equipped with the WID 310, a transceiver coordinator 320, an application processor 330, an electronic storage manager 315, a knowledge control center 360, at least one HMI device 350 (which communicates via an interface controller 340), and a software update coordinator and an enterprise service manager 325.

The WID 310 preferably comprises at least one transmitter and receiver which interact with the transceiver coordinator 320 to receive the broadcast signal 25 and interpret the first message therefrom. The WID also comprises a modulator device operative to transmit signals wirelessly to effect two-way communications. The WID 310 utilizes cellular or other technologies incorporated into the transceiver coordinator 320 to effect communications with the communication source 10. The WID 310 receives the broadcast signal 25 including the first message from the communication source 10, and transmits the second message via the two-way wireless message 35 to the communication source 10.

The storage manager 315 preferably comprises removable/portable storage media, e.g., DVDs, CDs, and thumbstick memory devices, and, embedded storage media in the form of hard-drive or chip memory devices. The WID 310 is operative to receive the broadcast signal 25, identify the first message and selectively route it to the storage manager 315 for caching and future use, or to the application processor 330 for immediate use.

The knowledge control center 360 preferably comprises an updatable electronic memory portion which contains states determined for a plurality of characteristics or parameters of the mobile platform. The application processor 330 interacts with the knowledge control center 360 to capture and generate information related to the specific mobile platform, as may be obtained by monitoring and observing via sensors the environment or the interactions of the user with the mobile platform through the HMI 350. The parameters of the mobile platform may include current location and the recent mobile platform trajectory when the mobile platform is equipped with a GPS ('global positioning system') device or is otherwise capable of determining geographic position. The knowledge control center 360 preferably includes a selective profile of the end user that is compiled on-board or off-board. The user profile preferably includes personal preferences, purchasing histories, previous platform trajectories, user/platform interactions and learning therefrom, user demographics, and other information useful to and selectable by the end-user. The user profile may be used by the mobile platform 30 to selectively access the first message of the broadcast signal and to selectively use the information in any interaction with the user. Software updates, new applications, and other data updates are selectively downloaded into the mobile platform 30. Interactions with the user, including the selective display of advertisements, may be governed by the user profile. The software update coordinator/enterprise service manager 325 provides functionality to update operating software of the mobile platform 30, and manage information related to the enterprise for which the mobile platform is utilized.

The HMI 350 may include touch or stylus-sensitive displays, alpha-numeric keypads, scrolling devices and other devices. Additional HMI functionality is envisioned wherein handheld devices on the mobile platform 30 are interfaced with a docking structure on a vehicle through which enhanced input/output control may be achieved. Through such HMI, the operator is able to interact with the device to receive and communicate the content of the first message, as managed through the interface controller 340. The modality of the content of the first message delivered to the HMI(s) may be in the form of user-interpretable text, images, videos, and/or sounds or output signals. The modality is adjustable based on mobile platform dynamics and the expected consumer of the content of the first message, i.e., a user holding the mobile platform 30. The user includes an individual holding the handheld device 30. The user includes the operator or passenger interacting with an on-vehicle device as the mobile platform 30'.

The application processor 330 comprises an element of the operating system for the mobile platform 30 which calls specific programs and systems in the receiver into action and manages interactions. This includes capturing selected portions of the broadcast signal 25 which comprise the first message, routing the first message to the storage manager for storage, routing the first message to the HMI device, routing software updates from the software update coordinator 325 to the storage manager 315, routing information from the knowledge center 360 and other locations for transmission by the WID 310 to the communication source 10, and performing other information processing operations. The application processor 330 includes information management functionality, responsible for the storage and manipulation of information. It includes a collection of related functions, consisting of: managing mass data storage through the storage manager 315; maintaining security (e.g., authentication and digital rights management); audio, video, and information content storage and queuing; audio, video, and information content manipulation; and, HMI control.

In many cases, the content of the first message may have a limited life, and expire, or become outdated, at different time intervals. The application processor interacts with the communication source 10 by sending the second message thereto via the two-way wireless message 35 to selectively request refresh, or update of the content of the first message when expiration approaches or when new or replacement content is made available from the communication source 10. Such updates may alternatively be updated without such requests also. Thus the content of the first message may be formed based upon the second message. An example of such content is a collection of local vendors of goods and services. Some content, like availability of goods and services, prices, specials, location and contact information for an individual or some subset collection of vendor information can be updated independently of each other. Other content from services, such as news and weather, may be time-sensitive and may be programmed to expire automatically after a certain time period, or expire at a specific date and time.

The software update coordinator/enterprise service manager 325 operate to control the flow and use of information sent to the mobile platform, including collecting and transmitting information available to the mobile platform to the communications source 10 in the second message. The software update coordinator function comprises coordinating the distribution and updating of programming information, specifically executable code that is used on the mobile platform itself or by another device in proximity to the mobile platform. The programming information may be utilized by programmable devices, including central processing units, digital signal processing units, and other devices. The enterprise service management function includes managing enterprise services, such as services supplied to the user of the mobile platform. It also includes selection and display of advertising content. The enterprise service management function further includes generating the second message by gathering information originating at the mobile platform, and guaranteeing system integrity by performing functions such as provisioning (validating entitlement to services), authentication (validating legitimacy of broadcaster and mobile platform), and privacy management (through encryption and decryption and various ancillary functions).

The mobile platform 30' takes the form of an on-vehicle device. The mobile platform 30' has many of the same features and functions as the previously described handheld mobile platform 30, preferably with added functionality related to multiple users and related to application on a motor vehicle. Substantially similar functionality and apparatus are illustrated using the same reference numerals in FIG. 4 as were used in FIG. 3.

The transceiver, information management system, and various HMI devices are operative to communicate therebetween, and with on-vehicle data-buses to other vehicle systems, as shown. The mobile platform may include multiple HMI devices 350, 350', 350", each which communicates via the interface controller 340'. The vehicle software update coordinator 325' is signally connected to a vehicle databus 370, which is in signal communication with one or more on-vehicle control modules operative to control one or more vehicle systems. Through this connection, the software update coordinator 325' is operative to communicate a portion of the first message comprising updated executable code for vehicle operation to the appropriate vehicle control module. The knowledge control center 360' is adapted to determine states for a plurality of characteristics or parameters of the mobile platform 30', for example, vehicle operating parameters, settings, dynamics, and position when equipped with a GPS system or otherwise capable of determining geographic position. The knowledge control center 360' preferably includes selective profiles of one or more end users including vehicle operators and passengers that are compiled on-board or off-board. The knowledge control center 360' is signally connected to the vehicle bus 370 to obtain access to information associated with the vehicle operating parameters. User profiles corresponding to mobile platform 30' are generally similar to those described with regard to mobile platform 30.

In operation, each of the mobile platforms within range of the communication source 10 receives and interprets the broadcast signal 25 to obtain the first message. The mobile platform is operative to present the first message to the user in various modalities, or forms. Using vehicle attributes such as vehicle dynamics, vehicle type, vehicle usage profile, and demographics, a scheme is developed to provide an opportunistic delivery, receipt and caching of the content of the first message. In some vehicular systems it may be advantageous to update, modify, and refresh the message content while the vehicle is stationary, or nearly stationary. Furthermore, refreshing the message content may be better suited to periods of opportunistic availability of the communication channel bandwidth, such as when the bandwidth is shared with other users and applications. Further, user interactions may be modified based upon various factors including vehicle dynamics, vehicle type, vehicle usage profile, demographics, passengers, and operator skills. Furthermore, refreshing the message content may be better suited to periods of opportunistic availability of the mobile platform 30', which may be unable to receive the broadcast signal 25 because the mobile platform 30 is not powered, or the condition of the broadcast signal is poor, or other reasons.

During message content presentation, the modality of the content is in the form of end-user interpretable text, images, videos, and/or sounds or signal output. The modality may be adjusted based on vehicle dynamics and the intended consumer of the information. For example, video content display to the vehicle operator is preferably disabled during vehicle motion, or limited in modality to only audio. When the vehicle stops, or slows to a low speed, the video component may be reactivated and displayed. Furthermore the operator may personally control the specific modality to their preferences, for example, by stopping, or pausing, all playback of the content, including audio, until the vehicle stops or slows to low speed. For a passenger, the video and audio is not affected by the vehicle speed. However, a passenger may be able to control functions, such as stopping, pausing, reversing, or forwarding playback of content.

The content of the first message at the HMI may include formatted screen displays that are populated with current information. For example, a default screen can include dedicated size and position of a traffic map, a weather map and/or forecast, and advertisement content. The advertisement content may be linked, via the vehicle bus, to a telematics unit, through a simple user interface, operative to initiate a phone call or an interactive request for additional information. The advertisement content may be used to generate revenue that funds all, or part of, the operation of the content delivery system.

Other mobile platforms which may incorporate the system described herein include personal digital assistants (PDAs), cellular phones, personal entertainment devices, navigation/GPS devices, and integrated combinations thereof, including such devices which are adapted for handheld use as well as transportable among various docking systems including docking with a vehicle.

Features, applications and services that are enabled by opportunistic caching of data and services provided to vehicles through broadcast services may include, for example: vehicle performance enhancements and updates, navigation information, travel information, and entertainment information and files such as audio, image and video files. The system seeks opportunistic periods to deliver such material based on vehicle attributes. Further the presentation and use of the first message in the form of data and information sent by the system are provided at appropriate times based on user activity with the mobile platform.

In many cases, the content of the first message captured and stored at the communication receiver many have a limited life, and expire or become outdated at different time intervals. This system, as previously described with reference to the handheld mobile platform 30, can selectively refresh or update the content when expiration approaches or when new, or replacement content is made available with or without requests being implement by the mobile platform 30'. An example of such content is a collection of various vendors of goods and services. Some content, like availability of goods and services, prices, specials, location and contact information for an individual or some subset collection of vendor information are updated independently of each other. Some content can also have an expiration date and time. For example, specials may expire at a specific date and time. Other services, such as news, weather, and other time sensitive content may also expire automatically after a certain time period.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

Having thus described the invention, it is claimed:

1. Method for communicating between a single communications source and a mobile platform, comprising:
   equipping the mobile platform with a broadcast signal receiver device to receive a one-way broadcast signal and a two-way wireless communications device to transmit and receive a wireless two-way message;
   receiving a first message broadcast from the single communications source within the one-way broadcast signal at the mobile platform via the broadcast signal receiver device comprising caching a portion of the first message in an electronic memory storage device associated with the mobile platform;
   equipping the mobile platform with a software update coordinator;
   opportunistically updating executable code of the mobile platform when a portion of the first message cached in the electronic memory storage device comprises executable code for the mobile platform; and,
   wirelessly communicating a second message comprising the wireless two-way message between the single communications source and the mobile platform via the two-way wireless communications device.

2. The method of claim 1, wherein the one-way broadcast signal further comprises the first message incorporated into a one-way broadband broadcast signal.

3. The method of claim 2, further comprising opportunistically incorporating the first message into the one-way broadband broadcast signal during a period of available bandwidth.

4. The method of claim 1, further comprising forming the first message at the single communications source.

5. The method of claim 4, wherein forming the first message comprises assembling message content originating from a plurality of content providers at the single communications source.

6. The method of claim 1, further comprising wirelessly communicating the second message from the mobile platform to the single communications source.

7. The method of claim 6, further comprising forming content of the first message based upon the second message.

8. The method of claim 1, wherein the mobile platform comprises a handheld device.

9. The method of claim 8, wherein the handheld device comprises a transportable device adapted for docking with at least one of a docking structure on a vehicle.

10. The method of claim 1, wherein the mobile platform comprises a motor vehicle.

11. Method for communicating between a single communications source and a mobile platform, comprising:
   equipping the mobile platform with a transceiver device operative to receive a one-way broadband broadcast signal and execute two-way wireless communications to transmit and receive a wireless two-way message; an electronic storage device; a processor; and, a human-machine interface;
   receiving the broadcasted one-way broadband signal at the mobile platform by way of the transceiver comprising caching a portion of the broadcasted one-way broadband signal in the electronic memory storage device of the mobile platform;
   interpreting a first message from the received broadcasted one-way broadband signal;
   equipping the mobile platform with a software update coordinator;
   opportunistically updating executable code contained in the mobile platform when the portion of the first message cached in the electronic memory storage device comprises executable code for the mobile platform;
   forming a second message comprising the wireless two-way message; and,
   wirelessly communicating the second message between the single communications source and the mobile platform by way of the transceiver.

12. The method of claim 11, further comprising enabling the single communications source to form the first message at the single communications source, generate the one-way broadband signal based upon the first message, and, broadcast the one-way broadband signal from the single communications source.

13. The method of claim 12, further comprising enabling the single communications source to incorporate the first message into the one-way broadband signal during a period of available bandwidth in the one-way broadband broadcast signal.

14. The method of claim 11, comprising communicating the portion of the first message cached in the electronic memory storage device to the human-machine interface.

15. System for communicating a message to a mobile platform, comprising:

equipping the mobile platform with a communications transceiver to receive a one-way broadcast signal and transmit and receive a wireless two-way message, equipping the mobile platform with an electronic memory storage device caching a portion of the message;

equipping the mobile platform with a software update coordinator and opportunistically updating executable code of the mobile platform when a portion of the message cached in the electronic memory storage device comprises executable code for the mobile platform;

an enterprise service manager, operative to receive authenticated inputs comprising the wireless two-way message from the mobile platform, structure the one-way broadcast signal comprising the message, and communicate with a single broadcast station; and, the single broadcast station operative to selectively broadcast the one-way broadcast signal comprising the message to the communications transceiver of the mobile platform.

* * * * *